United States Patent
Garmon et al.

(10) Patent No.: US 10,044,246 B2
(45) Date of Patent: Aug. 7, 2018

(54) ELECTRIC GENERATOR WITH VARIABLE MAXIMUM EFFICIENCY

(71) Applicant: Siemens Energy, Inc., Orlando, FL (US)

(72) Inventors: Michael D. Garmon, Orlando, FL (US); Raul Ricardo Rico, Oviedo, FL (US); Bobby A. Warren, Fort Mill, SC (US)

(73) Assignee: SIEMENS ENERGY, INC., Orlando, FL (US)

( * ) Notice: Subject to any disclaimer, the term of this patent is extended or adjusted under 35 U.S.C. 154(b) by 267 days.

(21) Appl. No.: 14/938,364

(22) Filed: Nov. 11, 2015

(65) Prior Publication Data
US 2016/0211722 A1 Jul. 21, 2016

Related U.S. Application Data

(60) Provisional application No. 62/105,798, filed on Jan. 21, 2015.

(51) Int. Cl.
*H02K 9/00* (2006.01)
*H02K 9/197* (2006.01)
(Continued)

(52) U.S. Cl.
CPC ............. *H02K 9/197* (2013.01); *H02K 9/08* (2013.01); *H02K 9/10* (2013.01); *H02K 9/19* (2013.01);
(Continued)

(58) Field of Classification Search
CPC .......... H02K 1/27; H02K 7/003; H02K 9/197; H02K 9/08; H02K 9/10; H02K 9/19; H02K 3/24; H02K 2213/09; H02P 8/36
(Continued)

(56) References Cited

U.S. PATENT DOCUMENTS 3,240,967 A * 3/1966 Krastchew ............ H02K 9/005
310/54
3,816,751 A 6/1974 Jampen et al.
(Continued)

FOREIGN PATENT DOCUMENTS

JP 2000116061 A * 4/2000
JP 2012039702 A 2/2012

OTHER PUBLICATIONS

Machine Translation JP2000116061 (2000).*
(Continued)

*Primary Examiner* — Thanh Lam

(57) ABSTRACT

Disclosed is a variable performance large electric generator, comprising, a rotor arranged along a centerline of the generator; a core arranged coaxially and surrounding the rotor; a plurality of stator windings arranged within the core; a stator frame arranged to fixedly support the core and rotationally support the rotor; a gas cooling system that circulates a cooling gas within the generator; a liquid cooling system that circulates a cooling liquid to cool the stator windings wherein the cooling ability of the liquid cooling system is a function of a required generator parameter; a pressurizing system that operatively pressurizes the cooling gas to a maximum pressure of two (2) bar relative to atmospheric pressure, wherein the pressurizing system continuously determines the cooling gas pressure based upon a required generator parameter; and a control system that controls the cooling ability of the liquid cooling system in conjunction with the cooling gas pressure.

15 Claims, 4 Drawing Sheets

(51) Int. Cl.
  *H02K 9/08*     (2006.01)
  *H02K 9/19*     (2006.01)
  *H02K 9/10*     (2006.01)
  *H02P 8/36*     (2006.01)
  *H02K 3/24*     (2006.01)

(52) U.S. Cl.
  CPC ................. *H02P 8/36* (2013.01); *H02K 3/24* (2013.01); *H02K 2213/09* (2013.01)

(58) Field of Classification Search
  USPC .............................................. 310/89, 52–59
  See application file for complete search history.

(56) References Cited

U.S. PATENT DOCUMENTS

| | | | |
|---|---|---|---|
| 7,271,515 B2 | 9/2007 | Joho | |
| 2002/0047340 A1* | 4/2002 | Lewis | H02K 7/025 310/52 |
| 2006/0091742 A1 | 5/2006 | Wang | |
| 2008/0168796 A1 | 7/2008 | Masoudipour et al. | |
| 2013/0342044 A1* | 12/2013 | Vallinayagam | H02K 5/20 310/53 |
| 2014/0353975 A1* | 12/2014 | Newcomb | F03D 9/00 290/54 |

OTHER PUBLICATIONS

PCT International search report dated Mar. 29, 2016 corresponding to PCT International application No. PCT/US2015/066558 filed Dec. 18, 2015 (10Pages).

* cited by examiner

ELECTRIC GENERATOR WITH VARIABLE MAXIMUM EFFICIENCY

CLAIM OF PRIORITY AND CROSS REFERENCE TO RELATED APPLICATIONS

The instant application claims benefit and priority to U.S. provisional application 62/105,798 filed on Jan. 21, 2015 and is incorporated herein in its entirety. Furthermore, this application is related to application Ser. Nos. 14/938,330; 14/938,313; 14/938,342 and 14/938,382 filed concurrently.

FIELD OF THE INVENTION

The present invention relates to high voltage power generation equipment and, more particularly, to a variable performance electric generator.

BACKGROUND OF THE INVENTION

Dynamoelectric high-voltage machines and/or high-voltage systems, such as electrical generators in power plants, represent a substantial capital investment. Furthermore, it is desirable to avoid over-sizing in terms of the performance capability of the generator Due to the serious technical issues presented to the power generation industry due to part-load and varying-load operation, there is a significant need for a simple, low cost generator with a variable maximum efficiency/variable maximum out-put as well as a generator with reduced winding insulation thermal stresses and greater winding life.

SUMMARY OF THE INVENTION

One aspect is a variable performance large electric generator, including a rotor arranged along a centerline of the generator; a core arranged coaxially and surrounding the rotor; a plurality of stator windings arranged within the core; a stator frame arranged to fixedly support the core and rotationally support the rotor; a gas cooling system that circulates a cooling gas within the generator; a liquid cooling system that circulates a cooling liquid to cool the stator windings wherein the cooling ability of the liquid cooling system is a function of a required generator parameter; and a pressure boundary member that surrounds a plurality of the rotor and an entirety of the core and stator windings, the frame configured to operatively contain an internal pressure of two (2) bar relative to atmospheric pressure.

A further aspect includes a pressurizing system that operatively pressurizes the cooling gas to a maximum pressure of two (2) bar relative to atmospheric pressure, wherein the pressurizing system continuously determines the cooling gas pressure based upon a required generator parameter.

A further aspect includes a control system that controls the cooling ability of the liquid cooling system in conjunction with the cooling gas pressure.

A further aspect includes the control system further controls the cooling ability of the liquid cooling system in conjunction with the cooling gas pressure as a function of the required generator parameter.

A further aspect includes the required generator parameter is a control room signal.

A further aspect includes the control room signal is selected from the group consisting of terminal voltage, phase current demand, power factor and combinations thereof.

A further aspect includes the cooling ability of the liquid cooling system is controlled to minimize thermal stresses of the stator windings.

A further aspect includes the control system further controls the liquid cooling system and the pressurization system to minimize a temperature variation of the stator windings.

A further aspect includes the cooling liquid is circulated within the stator windings.

A further aspect includes the cooling liquid directly cools the stator winding coils.

Another aspect includes a variable performance large electric generator, including a rotor arranged along a centerline of the generator; a core arranged coaxially and surrounding the rotor; a plurality of stator windings arranged within the core; a stator frame arranged to fixedly support the core and rotationally support the rotor; a gas cooling system that circulates a cooling gas within the generator; a liquid cooling system that circulates a cooling liquid to cool the stator windings wherein the cooling ability of the liquid cooling system is a function of a required generator parameter; a pressurizing system that operatively pressurizes the cooling gas to a maximum pressure of two (2) bar relative to atmospheric pressure, wherein the pressurizing system continuously determines the cooling gas pressure based upon a required generator parameter; and a control system that controls the cooling ability of the liquid cooling system in conjunction with the cooling gas pressure.

A further aspect includes the control system regulates the generator performance as a function the required generator parameter.

A further aspect includes the required generator parameter is a control room signal.

A further aspect includes the control room signal is selected from the group consisting of terminal voltage, phase current demand, power factor and combinations thereof.

A further aspect includes the control system further controls the liquid cooling system and the pressurization system to maximize generator efficiency.

A further aspect includes the control system further controls the liquid cooling system and the pressurization system to maximize generator power output.

A further aspect includes the cooling liquid is circulated within the stator windings.

A further aspect includes the cooling liquid directly cools the stator winding coils.

A further aspect includes the cooling liquid is circulated within the stator windings.

A further aspect includes the cooling liquid directly cools the stator winding coils.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

Figure 1:
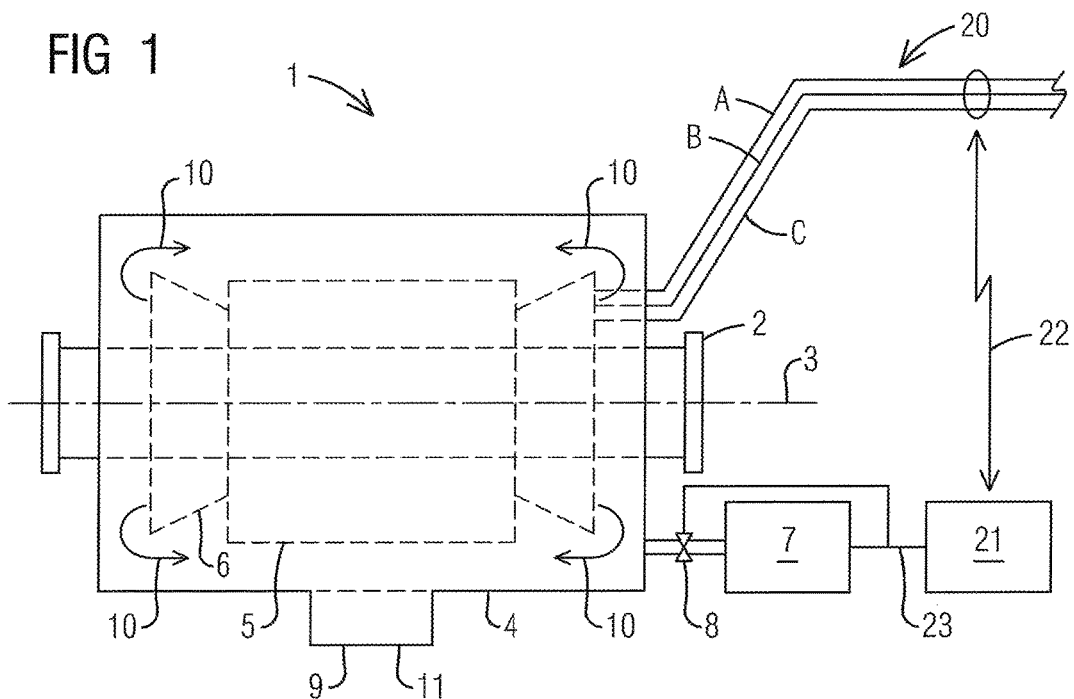
FIG. 1 depicts a gas cooled generator system, cooling gas pressurizing unit and associated control system.

In the following detailed description of the preferred embodiment, reference is made to the accompanying drawings that form a part hereof, and in which is shown by way of illustration, and not by way of limitation of the embodiment. It is to be understood that other embodiments may be utilized and that changes may be made without departing from the spirit and scope of this disclosure.

Currently, an electrical generator is configured or sized for the required maximum power output (MVA) which represents a particular physical configuration of the generator and an associated operating efficiency and cost to manufacture. However, modern power plants now see greater variation in required power output demand from the grid and associated operating conditions. In particular, one common variation modern power plants are experiencing is the requirement to operate at part-load conditions. For example, within the United States, generators do not typically operate at full load, rated power factor conditions. Instead, these generators typically operate approximately 80% of full load and at a variety of power factors. Part-load conditions can be any operating condition less than 100% power output. However, part-load operation typically is within the range of 20%-80% of maximum power output. Additionally, part-load conditions may be more specifically 60%-80% of maximum power output.

Furthermore, the state of the art of electric generator technology represents three primary configurations for cooling the generator rotor and stator, i) air cooling for both the rotor and stator, ii) hydrogen cooling for both the rotor and stator, and iii) water cooling for the stator coils and hydrogen cooling for the rotor and stator core. Air cooled electric generators are lower cost and mechanically less complex than hydrogen cooling and/or the combination of hydrogen and water cooling.

Advances in power plant prime mover power output capability have led to a demand for generator ratings that extend beyond the current capability of low-cost, conventional air-cooled units. Conventional air-cooled designs in the industry have generally been limited to approximately 350 MVA.

Typically, for applications above 350 MVA, a pressurized hydrogen-cooled generator is required. Although hydrogen is an excellent coolant, hydrogen-cooled generators are inherently more complex, more expensive to build and more expensive to operate than air-cooled generators due to the need to (i) prevent the mixing of hydrogen and air (i.e. complicated and expensive sealing systems and operating procedures) and (ii) the need to contain a potential hydrogen explosion within the generator (a very robust pressure vessel frame capable of containing the explosion pressure).

Furthermore, with the typical gas-cooled (air or hydrogen) generator, the cooling gas circuit is designed for 100% power output of the generator. However, when operating at part-load, the generator is not producing full power but the windage losses from the cooling gas circuit remain constant. Therefore, the generator and the power plant are operating at sub-optimal efficiency.

In addition to part-load operation, another common variation modern power plants are experiencing is the requirement to change load frequently. An issue associated with varying-load operation of the generator is large variations in operating temperatures of the stator and rotor windings due to the variations in power output to match the operational load demand. The variations in operating temperatures of the windings results in excessive thermal stress cycles of the winding components and premature aging of the insulation materials due to the change from one operating state of the generator to another, see FIG. 5.

Heat from traditional gas cooled generators is removed through convective heat transfer from the generator active components to the cooling gas. In the most simplistic terms, heat is primarily removed from generator components via convective heat transfer which is defined by:

$$Q = m^* Cp^* dTg.  \quad \text{Eq. (1), and}$$

$$Q = h^* A^* dTs, \text{ where } h \text{ is } f(m,k) \quad \text{Eq. (2).}$$

As can be seen by examination of Eq. (1) above, heat to be removed from the generator (Q) can be increased by increasing cooling gas mass flow rate (m), cooling gas specific heat (Cp), and/or the cooling gas temperature rise along the flow-path (dTg). Eq. (2) shows that Q can also be increased by increasing the heat transfer coefficient (h) as well as the temperature differential between the component temperature and the cooling gas (dTs). Furthermore, the heat transfer coefficient is a direct function of m and gas thermal conductivity (k). Heat transfer can also be increased by increasing the surface area (A) of the component to be cooled, but this is typically constrained by other design criteria. Increasing the cooling gas pressure from 0 to 1 bar gage effectively doubles m and therefore the cooling capacity of the gas. The dTs is typically limited by the material properties used in the construction of the generator components. However, dTs is generally maximized while meeting design requirements such as low and high cycle fatigue life and acceptable thermal stresses. The Cp and k are dependent on the selected cooling gas chemistry. Typically, Cp and k are greater for lighter gases like hydrogen or helium, and less for heavy gases such as air, molecular nitrogen or carbon dioxide. Historically, generator designs have tried to optimize heat removal through the optimal selection of Cp and k of the cooling gas along with the cooling gas density by determining a fixed operating gas pressure.

It can be observed that the largest benefit from pressurization occurs from 0 bar gauge to 1 bar gauge pressure, i.e. a doubling of cooling gas pressure results in a doubling of the heat transfer capacity of the cooling gas. Increased benefit due to higher pressurization diminishes as the cooling gas pressure increases above 1 bar gauge pressure. However, further pressurization to approximately 2 bar gauge pressure may still provide acceptable heat transfer and performance gains. However, the drawback of increased pressurization is increased fluid pumping losses (known as windage) due to the increased density of the cooling gas.

The positive and negative impacts of cooling gas pressurization must be balanced to obtain an optimal configuration. Gas pressurization increases heat removal capacity, but also increases the heat generation through windage/friction and therefore reduces efficiency of the generator.

Referring to FIG. 1, an embodiment provides a gas cooled generator 1. The generator 1 includes a rotor 2 arranged along a centerline 3 of the generator 1. The generator further includes a stator core 5 arranged coaxially with the rotor 2 and at least partially surrounds the rotor 2.

Figure 2:
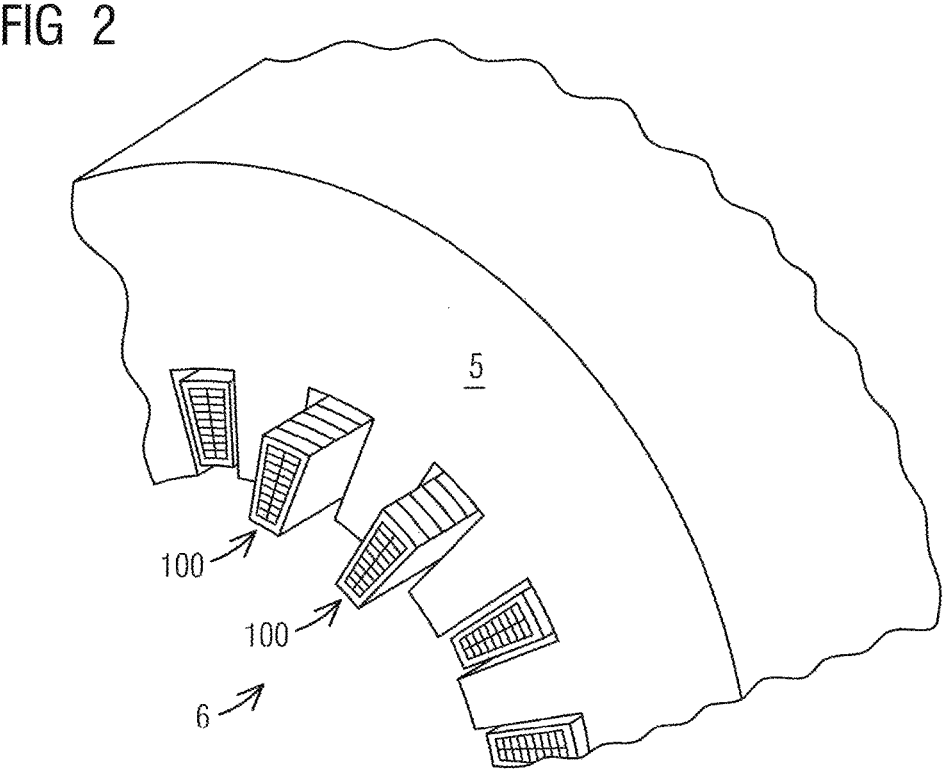
FIG. 2 is depicts a stator core and a winding coil residing within the core.
Figure 3:
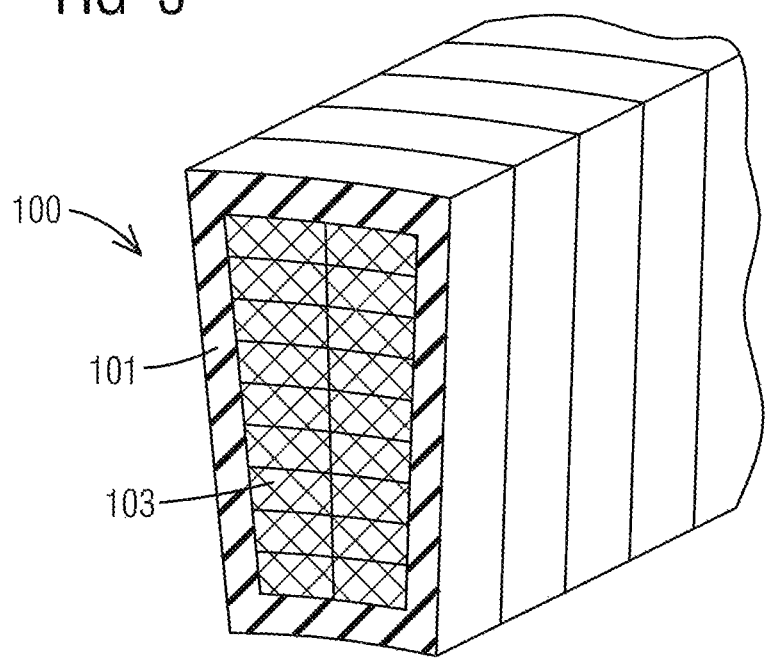
FIG. 3 depicts an insulated coil.

As can be seen in FIGS. 2 and 3, the stator core 5 supports a plurality of electrical conducting coils 100. The plurality of coils 100 are commonly known within the power generation industry as windings 6. The coil 100 typically consist of electrical conductors 103 surrounded by electrical insulation 101 to electrically isolate the electrical conductors from the stator core 5 and other surrounding components of the generator 1. One of ordinary skill in the art of electrical generator design can readily appreciate that there are several common schemes for cooling the windings 6.

Figure 4:
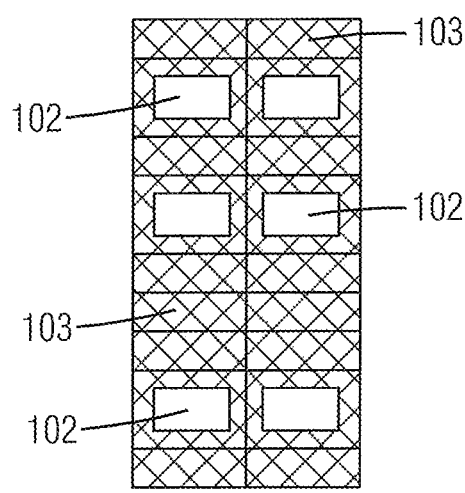
FIG. 4 depicts an end view of coil showing the conductors.

For example, as can be seen in FIGS. 2, 3 and 4, coil 100 can be cooled indirectly by conductive heat transfer to the stator core 5. That is, the winding 6 is not cooled directly by a cooling medium. Rather, the heat generated within the coil 100 due to operation is conducted to the stator core 5 and the stator core 5 is then cooled by a cooling medium.

In a further example, and as can be seen in FIG. 4, another means of cooling the coil 100 is direct cooling, where cooling passages 102 are formed within or adjacent to the coil 100 itself. The cooling passages 102 can be formed integrally with and as an electrical conductor 103 or the cooling passages 102 can be formed discretely from the electrical conductor 103 as a separate component.

Referring again to FIG. 1, the embodiment further provides a low pressure pressurizing unit 7 configured to vary an operating pressure of a non-explosive cooling gas 10 typically between atmospheric pressure (0 bar gauge) and 1 to 2 bar above atmospheric (1 to 2 bar gauge) as determined by control system 21. The pressurizing unit 7 may incorporate a compressor to pressurize the cooling gas, a pressure reservoir to store a large volume of compressed gas to facilitate the rapid pressurization of the generator 1 as determined by the control system 21, and an adjusting device 8 where the adjusting device 8 may be a control valve. Furthermore, the compressor could be a standalone device or could be represented an extraction of compressed gas from another device like a gas turbine compressor or steam turbine.

The control system 21 continuously senses a state of the power output of the generator to the electrical grid 22. The control system 21 may sense the load on the generator 1 from typical control room signals, for example, such as terminal voltage, phase current demand, and power factor. The control system 21 then compares the sensed generator output signal 22 to the load demand of the generator 1 and determines an optimum pressure of the cooling gas 10 based on a predetermined control scheme. Once the optimum pressure of the cooling gas 10 is determined by the control system 21 in conjunction with the predetermined scheme, a control signal 23 is generated by the control system 21 and transmitted to the pressurizing unit 7. The pressurizing unit 7 then adjusts the operating pressure of the cooling gas 10 in accordance with the control signal 23. The pressure control scheme can be customized to maximize generator efficiency.

Figure 5:
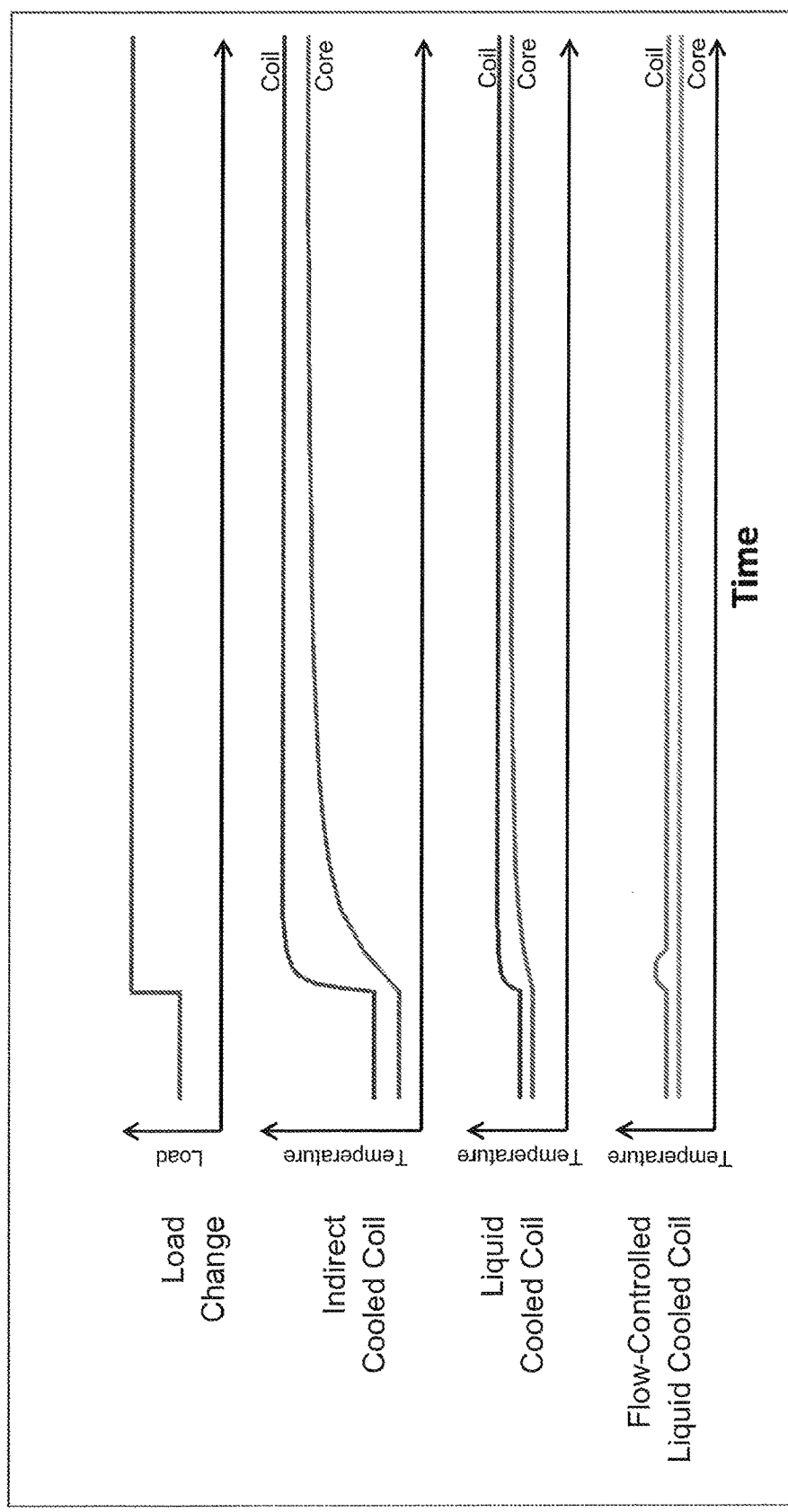
FIG. 5 depicts various coil thermal responses due to a step change in generator load.

A further aspect may utilize liquid cooling of the stator coil 100 to provide additional operational flexibility, improved efficiency and reliability of the coil 100, see FIGS. 4 and 5. The combination of direct liquid cooling of the stator coils 100 with low pressure non-explosive gas cooling of the stator core 5 and the rotor 2 results in greater operational flexibility and efficiency of the generator 1. Liquid cooling of the stator coils 100 eliminates the heat load from the stator coils 100 on the cooling gas 10 which thereby reduces the heat demand on the overall cooling gas system (i.e. cooling unit 9, cooling gas 10, blower 11 and pressurizing unit 7). Therefore, the losses due to the gas cooling system can be minimized.

Additionally, the control system 21 may further control the pressurizing unit 7 along with the liquid cooling of the stator coils 100 to regulate the generator component temperatures in accordance with the predetermined scheme to minimize thermally induced stresses of the various components like the stator coils 100 and rotor 2, so as to maximize the life of the low pressure non-explosive gas generator 1 in environments where load cycling is excessive, see FIG. 5.

A further aspect utilizes a pressure boundary member 4 to contain the pressure of the cooling gas 10. The pressure boundary member 4 may be formed as a frame from thin plate material or as a semi-flexible pressure containment device formed from film or fabric, all of which may be made from a polymer, metallic or composite materials of sufficient construction to withstand the operating environment of the generator, i.e. temperature, pressure, vibration and environmental considerations. Typically, metallic thin plate material utilized for the low pressure frame or pressure boundary member 4 may be between approximately 5 mm and 15 mm thick and film or fabric may be between approximately 1 mm and 5 mm thick. Typical hydrogen cooled generators have much thicker steel walled frames due to the fact that the hydrogen cooling gas pressure is typically 3 to 5 bar gauge pressure, as well as the frame must be strong enough to contain the internal pressure due to an explosion of the hydrogen cooling gas. In order for the typical hydrogen cooled generator frame to contain the pressure for an internal explosion of hydrogen cooling gas, the frame walls are typically approximately 19 mm to 51 mm thick. The present frame or pressure boundary 4 is intended only to withstand the relatively low pressure of 1 to 2 bar gauge pressure and due to the non-explosive nature of the cooling gas; the frame 4 does not have to contain explosion pressures. Therefore, the low pressure frame need 4 only be sized and configured to meet the operating conditions of a non-explosive cooling gas low pressure generator and not the explosion pressures resulting in a structurally thinner frame or pressure boundary member 4.

Additionally, through the benefit of low pressure gas cooling to a maximum of 1 to 2 bar gauge pressure, the entire generator can be sized much smaller than an equivalent output traditional air cooled generator. For example, the present low pressure non-explosive gas generator 1 can be smaller in physical size than present air cooled generators by 10 to 35%. Preferably, the present low pressure non-explosive gas generator 1 could be 35% smaller in physical size than a typical air cooled generator, or alternatively, the present low pressure non-explosive gas generator 1 could achieve a 50% to 60% increase in power output compared to a typical air cooled generator of the same size or physical dimensions.

Figure 6:
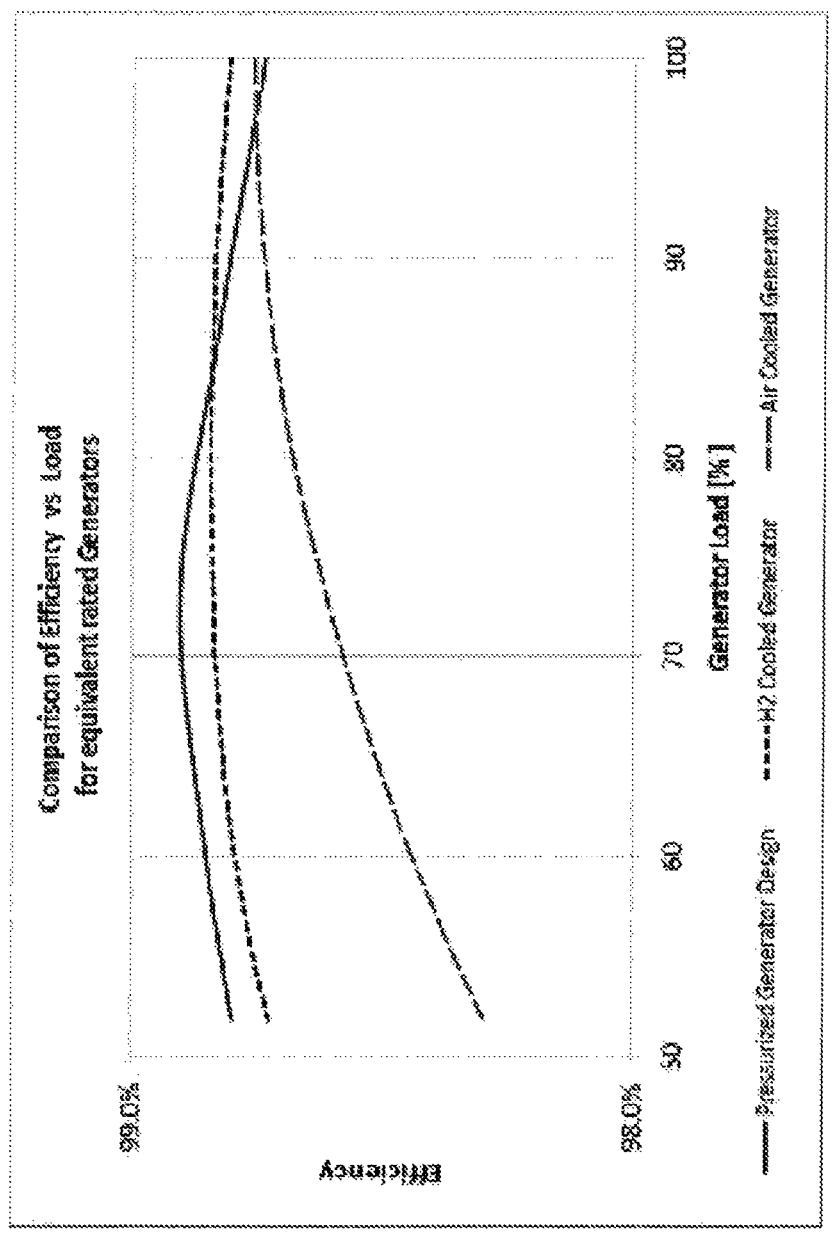
FIG. 6 depicts comparison of efficiency vs. load for equivalent rated generators.

Furthermore, if the power output demands of the generator exceed the power output limits of the generator 1, the cooling gas pressure can be quickly and easily increased up to 1 bar gauge pressure and furthermore to a maximum of 2 bar gauge pressure for additional generator power output capacity. For example, by varying gas pressure between 0 and 1 bar gauge, an increase of approximately 50% of additional power output capability with no other modification required to the generator 1, see FIG. 6.

Furthermore, the cooling system of the low pressure non-explosive gas generator 1 is physically smaller than that of a typical air cooled generator due to the combination of pressurized air cooling and a water-cooled stator winding. Therefore, the windage losses for the low pressure non-explosive gas generator 1 are greatly reduced as compared to an equivalent power output traditional air cooled generator. At power outputs less than 100% rated output, the cooling gas pressure of the low pressure non-explosive gas generator 1 can be reduced to obtain the overall efficiencies that improve at partial load, see FIG. 6.

In a further aspect, the low pressure non-explosive gas generator 1 may utilize alternate gasses as the cooling medium. Such gases are listed in Table 1 below.

TABLE 1

| Refrigerant Number | Name |
| --- | --- |
| — | Air |
| R-704 | Helium |
| R-702 | Hydrogen |
| R-720 | Neon |
| R-728 | Nitrogen |
| R-740 | Argon |
| R-134a | Tetrafluoroethane |
| R-152a | Difluoroethane |
| R-717 | Ammonia |
| R-744 | Carbon Dioxide |

Additionally, the gasses identified in Table 1 may also be mixed in various combinations to provide specific performance characteristics.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A variable performance large electric generator, comprising,
    a rotor arranged along a centerline of the generator;
    a core arranged coaxially and surrounding the rotor;
    a plurality of stator windings arranged within the core;
    a gas cooling system that circulates a cooling gas within the generator;
    a liquid cooling system that circulates a cooling liquid to cool the stator windings wherein the cooling ability of the liquid cooling system is a function of a required generator parameter;
    a pressurizing system that operatively pressurizes the cooling gas to a maximum pressure of two (2) bar relative to atmospheric pressure, wherein the pressurizing system continuously determines the cooling gas pressure based upon a required generator parameter; and
    a control system that controls the cooling ability of the liquid cooling system in conjunction with the cooling gas pressure,
    wherein the control system is configured to sense a load of the generator and to compare the sensed load to a load demand of the generator and to determine an optimum operating pressure of the cooling gas, and
    wherein the pressurizing system is configured to adjust an operating pressure of the cooling gas in accordance with the determined optimum operating pressure.

2. The generator of claim 1, wherein the control system regulates the generator performance as a function the required generator parameter.

3. The generator of claim 2, wherein the required generator parameter is a control room signal.

4. The generator of claim 3, wherein the control room signal is selected from the group consisting of terminal voltage, phase current demand, power factor and combinations thereof.

5. The generator of claim 4, wherein the control system further controls the liquid cooling system and the pressurization system to maximize generator efficiency.

6. The generator of claim 4, wherein the control system further controls the liquid cooling system and the pressurization system to maximize generator power output.

7. The generator of claim 5, wherein the cooling liquid is circulated within the stator windings.

8. The generator of claim 5, wherein the cooling liquid directly cools the stator winding coils.

9. The generator of claim 6, wherein the cooling liquid is circulated within the stator windings.

10. The generator of claim 6, wherein the cooling liquid directly cools the stator winding coils.

11. The generator of claim 1, wherein the optimum operating pressure of the cooling gas is determined based on a predetermined pressure control scheme.

12. The generator of claim 11, wherein the predetermined pressure control scheme is customized to maximize an efficiency of the generator.

13. A method for operating an electric generator, wherein the generator comprises a rotor arranged along a centerline of the generator, a core arranged coaxially and surrounding the rotor and a plurality of stator windings arranged within the core, the method comprising:
    circulating a cooling gas within the generator by a gas cooling system;
    circulating a cooling liquid to cool the stator windings by a liquid cooling system;
    sensing a load of the generator and comparing the sensed load to a load demand of the generator and determining an optimum operating pressure of the cooling gas by a control system;
    adjusting an operating pressure of the cooling gas in accordance with the determined optimum operating pressure and pressurizing the cooling gas to a maximum pressure of two (2) bar relative to atmospheric pressure by a pressurizing system; and
    controlling a cooling ability of the liquid cooling system in conjunction with the cooling gas pressure by the control system.

14. The method of claim 13, wherein the optimum operating pressure of the cooling gas is determined based on a predetermined pressure control scheme.

15. The method of claim 14, wherein the predetermined pressure control scheme is customized to maximize an efficiency of the generator.

* * * * *